Dec. 10, 1929.                E. M. STRADER                1,738,972
                                 TOASTER
                           Filed March 19, 1928
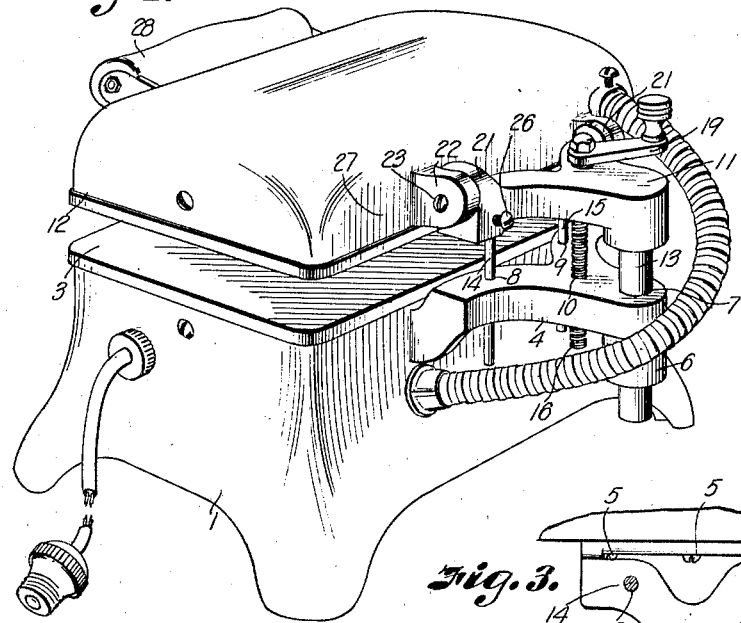
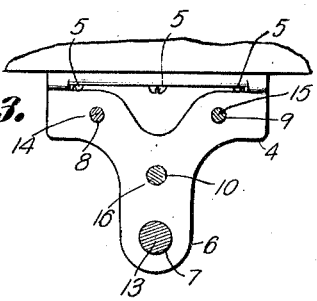
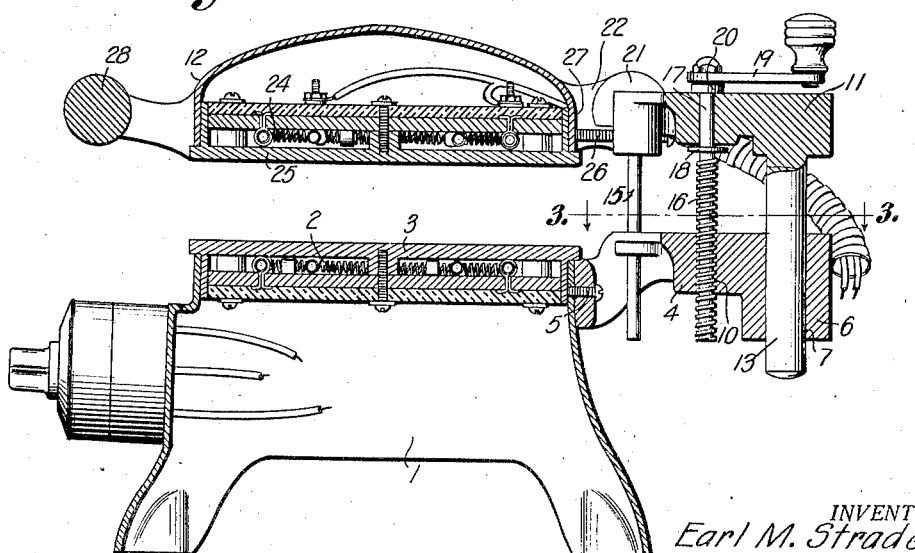
INVENTOR.
Earl M. Strader
BY Arthur C. Brown
ATTORNEYS.

Patented Dec. 10, 1929

1,738,972

UNITED STATES PATENT OFFICE

EARL M. STRADER, OF KANSAS CITY, MISSOURI, ASSIGNOR TO CHARLES A. LEMASTER, OF KANSAS CITY, MISSOURI

TOASTER

Application filed March 19, 1928. Serial No. 262,871.

My invention relates to toasters, and more particularly to means for mounting the cover element of a so-called double toaster on the base element, the principal objects of the invention being to support the cover in various positions parallel to the base, to provide for convenient adjustment of the cover in relation to the base, and to permit tilting of a cover thus adjustably supported from a base.

In accomplishing these and other objects of the invention I have provided improved details of structure, the preferred forms of which are illustrated in the accompanying drawings, wherein:

Fig. 1 is a perspective view of a toaster embodying my improvements.

Fig. 2 is a central vertical sectional view through the toaster.

Fig. 3 is a detail plan view of a bracket attached to the base member, the latter being shown fragmentarily.

Referring in detail to the drawings:

1 designates the base or supporting element of a toaster, having heating elements generally designated 2 of ordinary construction, and a horizontal heating plate 3. A laterally extending bracket 4 rigidly attached to the base by screws 5 is provided with a depending boss 6 adjacent its outer end, and with a support-plunger opening 7 extending through the boss. Rod-receiving openings 8 and 9 are further provided in the base bracket adjacent the base element, and a screw-threaded opening 10 is centrally located in the bracket. The various openings mentioned are provided to receive respectively the several supporting and guide members connected with a cover bracket extending laterally from the cover 11 whereby a cover 12 is supported from the base, a supporting plunger 13 fixed to the outer end of the cover bracket being slidable in the plunger opening 7 of the base bracket, and guide rods 14 and 15 fixed to the cover bracket being slidable in openings 8 and 9. The cover bracket and cover are supported by a screw 16 having a smooth portion 17 rotatably mounted in the cover bracket and provided with a collar 18 movable over the lower face of the bracket for supporting the same, the screw being further engaged in the screw-threaded opening of the base bracket. Rotation of the screw causes the cover bracket to move in relation to the base bracket, while the plunger and rods take lateral strain from the screw produced by the eccentric disposition of the weight of the cover element at one side of the bracket. The screw is operable by a crank 19 fixed on its upper end, and a washer 20 spaces the crank from the cover bracket.

Means for mounting the cover on the cover bracket comprise ears 21 of the bracket whereon the cover 12 is pivotally mounted on the cover bracket, the cover having lugs 22 comprising hinge members pivotally connected with the bracket ears by pintles 23. The cover comprises the usual casing and heating elements 24, and has a heating face plate 25 adapted to lie parallel with the face of the base member in various spaced positions therefrom. The cover is stopped in downward pivoting movement by stop members 26 such as set screws screw-threadedly engaged with the ears of the cover bracket and positioned to receive the rear side 27 of the cover. The cover is provided with a handle 28 for tilting the same.

In operating the device, the cover bracket may be quickly and easily elevated or lowered by means of the crank handle and operating screw, and the cover thus moved as desired to one or another spaced position in relation to the base, and the face of the cover plate will in all positions conferred by the screw be parallel with the base plate. The cover may thus be set suitably for toasting articles having greater or less thickness, and may be pivotally lifted for inspection or removal of the articles without changing the desired spacing of the cover and base.

What I claim and desire to secure by Letters Patent is:

1. In a toaster including a support, a cover, and means for heating the support and the cover, means adjustably spacing the cover from the support comprising lateral brackets on the support and the cover, a screw threaded in the support bracket and rotatable in the cover bracket, and guide posts fixed to the cover bracket and slidable in the support bracket.

2. In a toaster, a support including a heating plate supporting portion and a cover supporting portion, a cover, means for heating said plate and the cover, means adjustably supporting the cover from the support comprising a laterally extending bracket attached to the cover, and a screw threaded in said cover-supporting portion and rotatable in the cover bracket, and a plunger fixed to the cover bracket and slidable in said cover-supporting portion.

3. In a toaster, a base member, a cover member, and means for adjustably supporting the cover member from the base member in parallel relation therewith comprising a bracket on the base member, a second bracket on the cover member having a depending post slidable in an opening in the base member bracket, means pivotally supporting the cover from the cover bracket, and means for moving the cover vertically comprising a post screw-threadedly engaged with one bracket and rotatable in the other bracket.

4. In a toaster, a base member, a cover member, and means for adjustably supporting the cover member from the base member in parallel relation therewith comprising a bracket on the base member, a second bracket on the cover member having a depending post slidable in an opening in the base member bracket, and provided with lugs, the cover being pivotally supported by the lugs, and a post screw-threadedly engaged with the base member bracket and rotatable in the other bracket and having a shoulder for supporting said other bracket.

5. In a toaster, a base member, a cover member, and means for adjustably supporting the cover member from the base member in parallel relation therewith comprising a bracket on the base member, a second bracket on the cover member having a depending post slidable in an opening in the base member bracket, means retaining the cover in parallel relation with the base member, and a post screw-threadedly engaged with the base member bracket and rotatable in the other bracket and having a shoulder for supporting said other bracket.

6. In a toaster, including a base and a cover, means adjustably supporting the cover from the base including brackets extending laterally from the cover and the base, a screw threaded in one of said brackets and freely rotatable in the other, and a guide post fixed to one of said brackets and slidable in the other.

7. In a toaster, a base member, a cover member, means for supporting the cover member from the base member comprising brackets on the members, the bracket of one member having angularly spaced openings, the other member having angularly spaced depending posts slidable in said openings, means pivotally supporting the cover from the cover bracket, and means for moving the cover vertically comprising a post screw-threadedly engaged with one bracket and rotatable in the other bracket.

In testimony whereof I affix my signature.

EARL M. STRADER.